United States Patent
Luo et al.

(10) Patent No.: US 9,456,014 B2
(45) Date of Patent: Sep. 27, 2016

(54) DYNAMIC WORKLOAD BALANCING FOR REAL-TIME STREAM DATA ANALYTICS

(71) Applicant: TERADATA US, INC., Dayton, OH (US)

(72) Inventors: Congnan Luo, San Diego, CA (US); Heng Yuan, San Diego, CA (US); Elizabeth Jacqueline Stone Brealey, San Diego, CA (US); Gregory Howard Milby, San Marcos, CA (US)

(73) Assignee: Teradata US, Inc., Dayton, OH (US)

( * ) Notice: Subject to any disclaimer, the term of this patent is extended or adjusted under 35 U.S.C. 154(b) by 98 days.

(21) Appl. No.: 14/580,403

(22) Filed: Dec. 23, 2014

(65) Prior Publication Data

US 2016/0182588 A1   Jun. 23, 2016

(51) Int. Cl.
*H04L 12/26* (2006.01)
*H04L 29/06* (2006.01)
*G06F 17/30* (2006.01)
*H04L 29/08* (2006.01)

(52) U.S. Cl.
CPC ......... *H04L 65/60* (2013.01); *G06F 17/30516* (2013.01); *G06F 17/30595* (2013.01); *H04L 67/32* (2013.01)

(58) Field of Classification Search
USPC ................. 709/219, 224, 203, 250
See application file for complete search history.

(56) References Cited

U.S. PATENT DOCUMENTS

| | | | | |
|---|---|---|---|---|
| 6,195,680 B1 * | 2/2001 | Goldszmidt | ............ | H04L 12/56 709/203 |
| 8,069,094 B2 * | 11/2011 | Johnson | ............. | G06Q 30/0223 705/14.24 |
| 8,667,124 B2 * | 3/2014 | Qi | ....................... | H04N 21/6437 709/224 |
| 8,763,001 B2 | 6/2014 | Ghosh et al. | | |
| 9,241,190 B2 * | 1/2016 | Chowdhury | ....... | H04N 21/2223 |
| 2003/0018968 A1 * | 1/2003 | Avnet | .................. | H04N 21/2221 725/32 |
| 2004/0001161 A1 * | 1/2004 | Herley | .................. | H04H 60/56 348/465 |
| 2005/0066352 A1 * | 3/2005 | Herley | .................... | H04N 7/16 725/19 |
| 2008/0021874 A1 * | 1/2008 | Dahl | ................. | G06F 17/30899 |
| 2013/0073614 A1 * | 3/2013 | Shine | ....................... | G06F 8/70 709/203 |
| 2013/0160024 A1 | 6/2013 | Shtilman et al. | | |

(Continued)

OTHER PUBLICATIONS

Author: Uri Verner; Assaf Schuster; and Mark Silberstein Title: Processing Data Streams with Hard Real-time Constraints on Heterogeneous Systems Date: Jun. 2011 Publisher: Computer Science Department, Technion, Israel; Pertinent pages: abstract; pp. 2-4.*

(Continued)

*Primary Examiner* — Jude Jean Gilles
(74) *Attorney, Agent, or Firm* — Schwegman, Lundberg & Woesner, P.A.

(57) ABSTRACT

Router threads read real-time stream data as that data is received at processing nodes along a processing path for the data. The data is initially parsed into workloads. Each router thread maintains real-time analytics for the workloads and reports deviations in the analytics to a workload coordinator. The workload coordinator dynamically and in real time provides updated data distribution maps based on the reported deviations, and the router threads use the data distribution maps to determine a next processing unit to forward the workloads, where the next processing unit includes an instance of a next processing node in the processing path for the workload. The next processing node performs additional processing on the workloads along the processing path.

20 Claims, 6 Drawing Sheets

(56) References Cited

U.S. PATENT DOCUMENTS

2014/0052007 A1* 2/2014 Mcgregor ............ A61B 5/0205 600/484
2015/0221338 A1* 8/2015 Shaburova .............. G06T 5/005 386/281

OTHER PUBLICATIONS

"IBM InfoSphere Streams", (c) 2009 IBM Corporation [retrieved on Dec. 22, 2014]. Retrieved from the Internet: <URL: http://www.monash.com/uploads/IBM-InfoSphere-Streams-White-Paper.pdf>, (2009), 10 pgs.

"Load Balancing", [online]. (c) TIBCO Software Inc. [Retrieved on Dec. 22, 2014]. Retrieved from the Internet: <URL: https://docs.tibco.com/pub/businessevents/5.1.1_dec_2012/html/tib_be_architects_guide/wwhelp/wwhimpl/common/html/wwhelp.htm#href=objectmanagement.08.09.htm&, (2014), 1 pg.

* cited by examiner

DYNAMIC WORKLOAD BALANCING FOR REAL-TIME STREAM DATA ANALYTICS

BACKGROUND

Data is being captured, stored, tagged, indexed, mined, and consumed at alarming rates. Moreover, advancements in network connectivity and network bandwidth have permitted data to be omnipresent in our daily lives.

Data streaming permits individuals or enterprises to subscribe to data feeds (e.g., news feeds, business feeds, sports feeds, entertainment feeds, political feeds, etc.) and receive information on whatever device individuals prefer, such as phones, laptops, computers, wearable processing devices, and the like.

One problem with data streaming is that raw data from data feeds often progresses from original source feeds through a variety of intermediate processing sites before the final versions of the original data feeds reach the desired consumers. These intermediate processing sites can perform many value-added adjustments to the original source data, such as: filtering out some data that the consumer is not interested in, reformatting some data so it can be easily viewed and digested by the consumer on the consumer's desired device, aggregating some data with other data (such as metrics about the data, overlays of the data with other data, integrating data from a different data feed, and the like).

The intermediate processing sites can become bottlenecks in the timely delivery of information to the consumer especially when the processing sites enhance multiple types of data feeds. Moreover, even when a particular intermediate site designed to perform a particular data feed enhancement is replicated over the network for processing throughput efficiency, there is little to no coordination between different types of intermediate sites to ensure overall processing efficiency associated with delivering of a data feed from a source feed through multiple different types of intermediate processing sites to the consumer. This is so because often different entities are associated with different intermediate processing sites. So, even if one entity controlling one type of intermediate processing site effectively achieves processing throughput, there is still no guarantee that the consumer will receive the information in any more of a timely fashion. In fact, the consumer may actually experience further delay in receiving timely information if a next intermediate site from the processing efficient site becomes overloaded with processing because the processing efficient site is delivering data too rapidly for the next intermediate site to manage and process.

Furthermore, even assuming a source data feed and all its intermediate processing sites are capable of effectively coordinating processing throughput efficiencies, the efficiency may not be what is expected by the various entities because there is very little useful data analytics being presently gathered and shared by these entities. So, the assumption that merely adding more hardware and network connectivity can dramatically improve processing throughput efficiency is likely an incorrect assumption.

Thus, before intelligent decisions can be deployed to improve data feed delivery through a network of intermediate processing sites to a consumer, there needs to be better mechanisms for gathering real-time data analytics and adjusting for changes in the analytics in a dynamic and real-time fashion. This is so because network conditions dynamically change in real time, such that any static based processing improvement decision may be only a temporary patch before conditions change and the improvement becomes a less viable option than what existed before the improvement.

SUMMARY

In various embodiments, techniques and a system for dynamic workload balancing using real-time stream data analytics are presented. According to an embodiment, a method for dynamic workload balancing using real-time stream data analytics is provided.

Specifically, real-time stream data is read as it is received. Next, a determination is made as to whether there is any deviation in content associated with the real-time stream data relative to previous content for previously read real-time stream data. When a particular deviation exceeds a threshold value that particular deviation is reported to a workload coordinator. Finally, a data distribution map is dynamically received from the workload that indicates how the real-time stream data is to be distributed along a distribution path for the real-time stream data.

DETAILED DESCRIPTION

It is to be noted that the techniques presented herein are implemented as executable instructions that are programmed in memory or non-transitory computer-readable storage media (or medium) for execution on one or more processing devices, each processing device having one or more processors, and each processor specifically configured to execute the executable instructions.

The techniques and system herein propose a new and novel approach for memory, storage, network throughput, and processor efficient delivery of data feeds using dynamic workload balancing based on real-time stream data analytics.

As will be demonstrated herein, in a massively parallel processing computing environment, every analytic node responsible for data distribution continuously collects histograms of the stream data it receives. If an analytic node detects a significant change in the skewness of its local stream data, that node sends the histogram to a coordinating node. Then, the coordinating node combines the histograms from all data distribution nodes and analyzes them to find an optimal data distribution map. The map is broadcasted to all the distribution nodes. With the optimal data distribution map in the possession of each of the distribution nodes, a real-time dynamic workload balance for downstream analytic nodes is achieved. It is noted that a "node" is a logical concept and it can include a software process and/or a thread that performs some basic tasks during the stream analytic processing.

The description that follows discusses a deployment of dynamic workload balancing using real-time stream data analytics within a massively parallel and distributed Relational Database Management System (RDBMS), such as by way of example TERADATA®. However, it is to be noted that deployment can be applied to any data processing environment, such as by way of example only HADOOP® and others.

Figure 1:
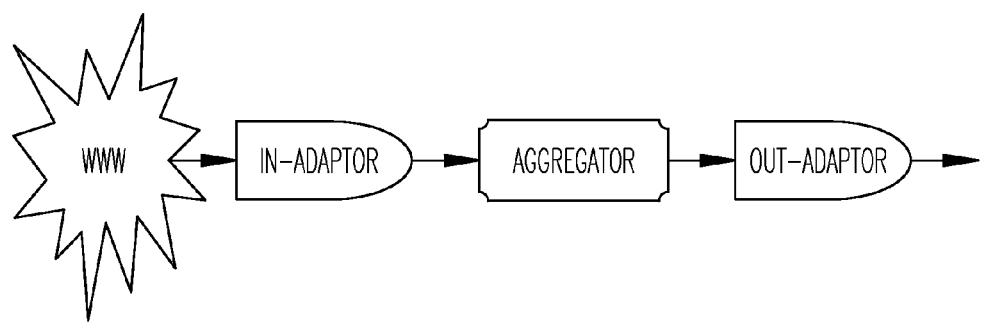
FIG. 1 is a diagram of an example data feed delivery system.
Figure 2:
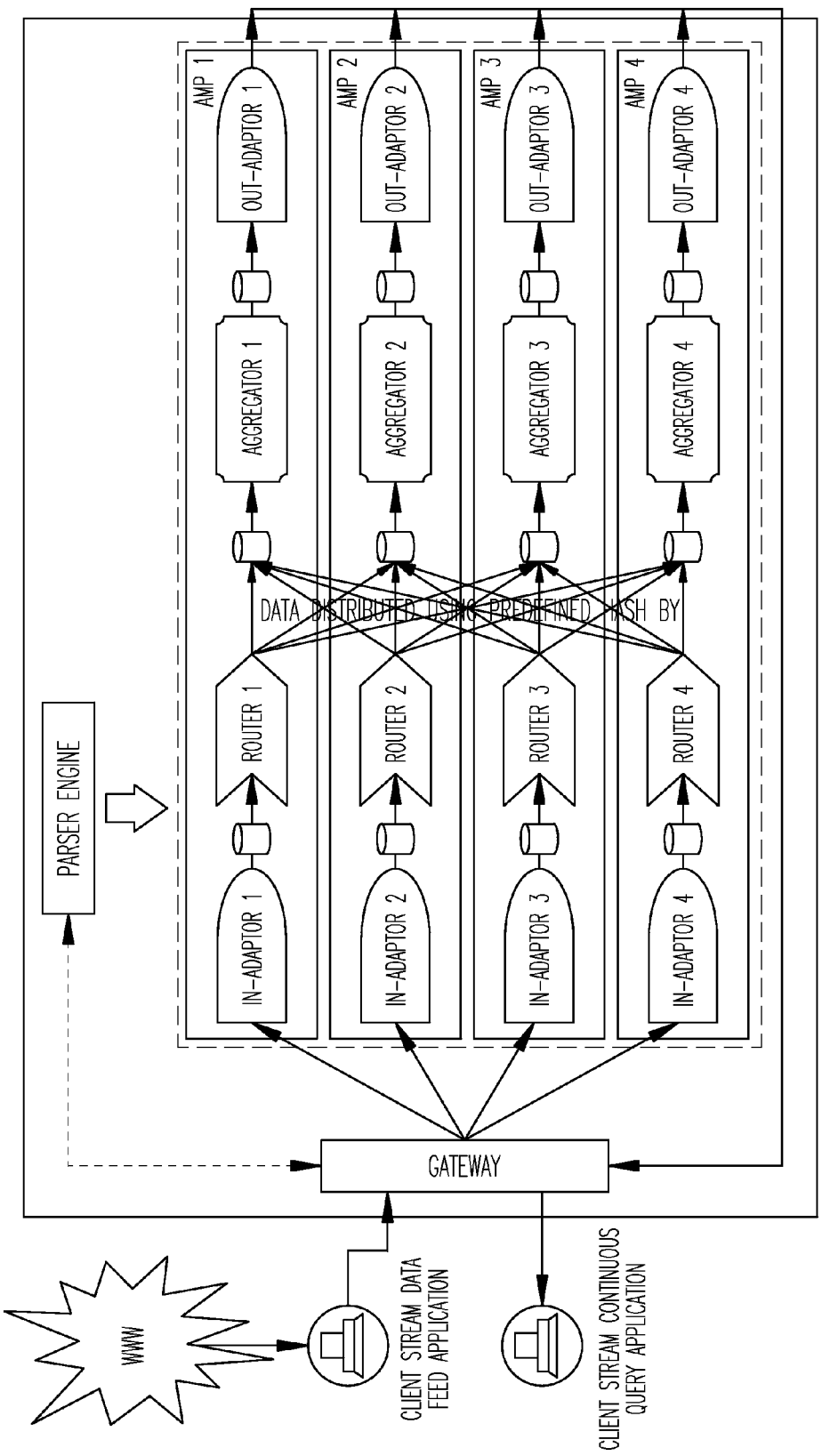
FIG. 2 is a diagram of an enhanced data feed delivery system of the FIG. 1 using data analytics in a parallel processing architecture, according to an example embodiment.
Figure 3:
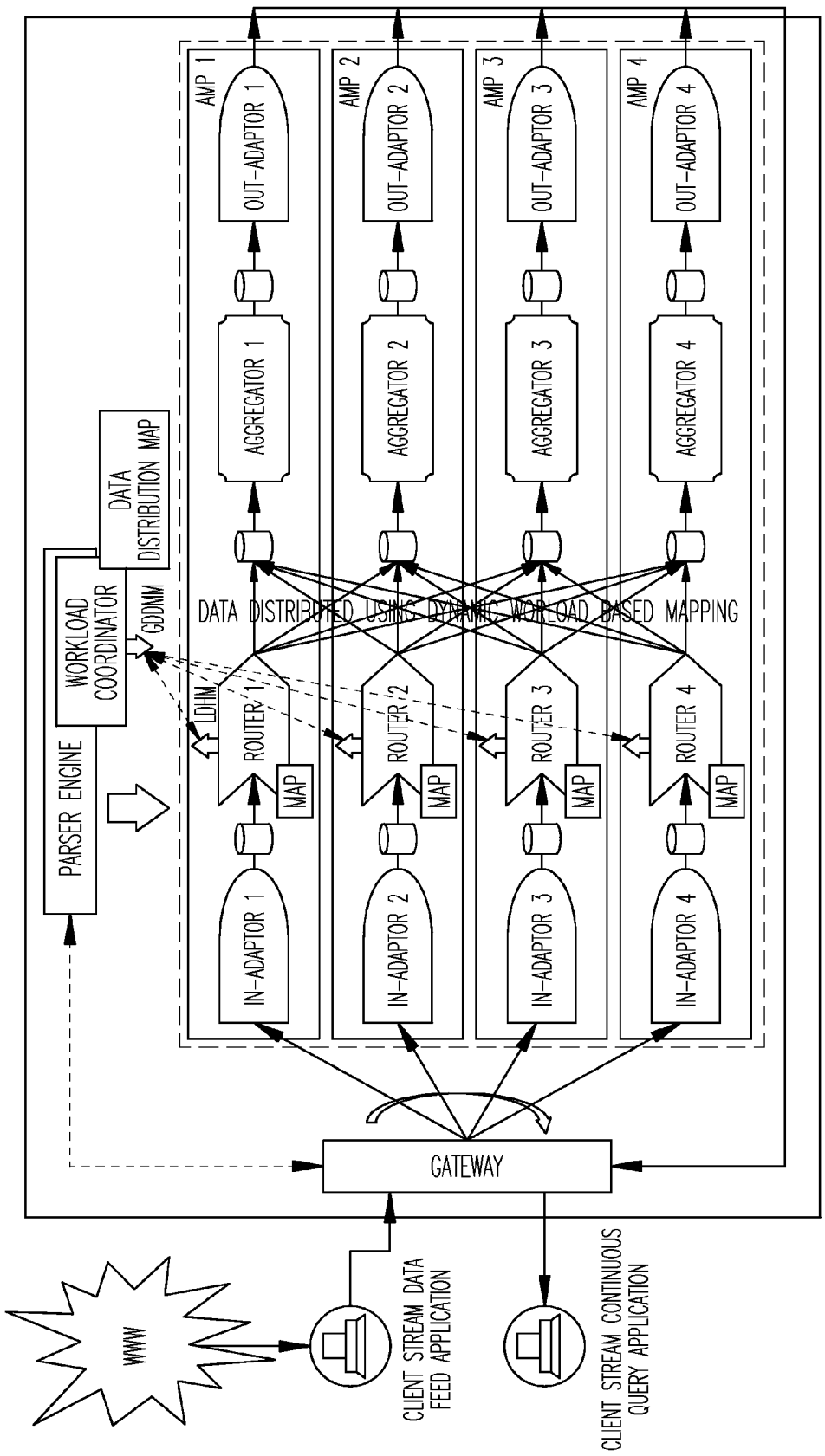
FIG. 3 is a diagram of an enhanced data feed delivery system of the FIG. 2 using dynamic workload balancing, according to an example embodiment.

The FIGS. 1-3 are now discussed within the context of an example for a financial organization that wants to implement a 24 hour a day and seven days a week service to monitor a selected group of domestic and international stocks to monitor the average prices for these stocks on a per minute interval of time.

It is noted that this is but one example scenario and that any conceivable scenario for delivering and/or monitoring a data feed can be achieved with the teachings that follow. The example is provided for illustration and comprehensive of the techniques and system presented herein.

In the world of stream analytics, the task to be achieved for the example can be described using a Data Flow Graph (DFG), where the stream data floods through the DFG nodes and each DFG node represents one type of simple task in the whole processing associated with achieving the goal of the financial organization timely, accurately, and efficiently obtain average stock processes on a per minute interval.

FIG. 1 is a diagram of an example data feed delivery system for the present example.

In the present example, the In-Adaptor node is responsible for obtaining real-time stock trading information from the outside world (source data feeds), and performing necessary data converting and/or filtering. Then, the collected stock stream data floods into an aggregator node, where the average is calculated for each stock per minute. The aggregated resultant stream will continue flooding into the Out-Adaptor node. Then, the Out-Adaptor may perform some post-processing and push the final resultant stream out to a client that is querying the stream (queried by a user or an automated application of the financial organization).

FIG. 2 is a diagram of an enhanced data feed delivery system of the FIG. 1 using data analytics in a parallel processing architecture, according to an example embodiment.

A stream data loading client first starts one or more data loading sessions and submits a stream data loading Structured Query Language (SQL) statement from a stream data control session. The Parser Engine (PE) processes the SQL statement and initiates an Access Module Processor (AMP) step on all or a group of AMPs to realize the In-Adaptor functionality. The In-Adaptor step can be processed by an AMP Worker Task (AWT) (i.e. an AWT Thread) on each AMP. Once the In-Adaptor step is started on each AMP, the client can start sending stream data to a RDBMS warehouse server through these sessions.

The client feeds (delivers) stream data to the Gateway through Transmission Control Protocol (TCP) over Internet Protocol (IP) (TCP/IP) connections. The gateway forwards each stream data message to an AMP that is selected in a round-robin fashion. This is the first processing location that begins workload balancing.

A stream query client may start one or more stream query sessions and submits a stream query SQL statement from a stream query control session. An example of such an SQL statement appears below. The WINDOW clause tells the Aggregator node to calculate the average price for each stock every 60 seconds for the requirements of the example. Once the calculation is done, the data that was scanned can be discarded.

SELECT stock_symbol, AVG(stock_price), CURRENT TIME( )
FROM STREAM (WINDOW TUMBLING TIME(60) ON StockTicker_StreamTable) PARTITION BY (stock_symbol);
WHERE stock_symbol IN (GOOG, FB, AAPL, EFUT, IDN, VISN, TCX, YY, REN, VG, VELT, TRT);

The Parser Engine initiates a sequence of AMP steps (Router Step, Aggregate Step, and Out-Adaptor Step) on each of the AMPs where the In-Adaptor step is running. On each AMP, an AWT task (i.e. AWT thread) takes care of one step. Between any two steps there is a First-In First-Out (FIFO) in-memory storage. The previous step in the sequence on each AMP writes its resultant stream to this storage and the next step reads the data from it. Once a piece of data is processed by the next step, it is deleted from the storage.

A Router node is added before the Aggregator node. This is to distribute the trade information of a stock to a single AMP so that the Aggregate node on each AMP can perform the average calculation (AVG( )) needed for the present example on all the data of a particular stock. In an embodiment, the data distribution adopted by the Router node is a Hash By (stock_name) mechanism, and the hash function is a predefined kernel function that the user cannot change. In this way, the distribution from this mechanism is one in which every AMP gets the same number of stocks (where the hash function guarantees a uniform distribution of its output hash values for distinct inputs). This is a second processing location where workload balancing is achieved. However, such a data distribution is achieved blindly based on the stock names, which may have nothing to do with the actual real-time dynamic traffic. However, such an approach works well when the data is not skewed. As shown in our example, the trading of GOOG (GOOGLE® stock symbol) is likely to be much more active than stock TRT (Trio-Tech International stock symbol). Thus, the same number of stocks on each AMP doesn't mean the same amount of data to be processed on each AMP. Furthermore, for a stock like EFUT (E-Future Information Technology, Inc. stock symbol), if there is any surprising news about it, the market might respond strongly and its trading activity could shoot very high for a few hours. So, EFUT's data distribution destination might need to be changed from one heavy-loaded AMP to another light-loaded AMP to balance the overall workload of the system. Thus, for such a situation what is actually needed is a mechanism that can catch the real-time skewness of the stream data that is flooding in and that adjusts the data distribution accordingly, which is discussed below with the FIG. 3.

Finally, the out-Adaptor pushes the resultant stream of the Aggregator node to the client through the gateway.

FIG. 3 is a diagram of an enhanced data feed delivery system of the FIG. 2 using dynamic workload balancing, according to an example embodiment.

Originally on each AMP, the Router step thread reads data from the FIFO in-memory storage on its left side. Each row read is a trade record of a stock. The Router thread inspects the stock name, calculates its hash value, and decides which AMP it should send the read row to. This distribution is predefined hash-based approach. The Router node no longer has to distribute rows based on the hash value of stock name. Instead, the Router node receives a Global Data Distribution Map Message (GDDMM) broadcasted from a new Parser Engine thread, called Workload Coordinator (WC), whenever the WC thinks it is necessary to adjust the current data distribution plan. GDDMM includes the latest global Data Distribution Map (DDM) that the WC has last computed. The DDM informs every Router thread to which AMP each stock trade record is be sent. It is noted that the data distribution has now changed to DDM-based approach (different from what was discussed above with the FIG. 2.

The Router thread needs to help the WC optimize the latest global DDM. So, Router thread keeps updating (dynamically and in real time) a histogram that is actually a table of counters. Each counter records how many rows that counter receives for a stock, since the last reset of the histogram. The Router thread also spans a timer thread. For every N seconds, the timer thread wakes up once and takes a snapshot of the then-current histogram and then reset it to all Os. The Router thread also compares the current histogram with a previously saved one. Assume that there are K stocks $S_1, S_2, \ldots, S_k$. The counters of current histogram for the stocks are $C_1, C_2, \ldots C_k$, and the counters in the previously saved histogram are $O_1, O_2, \ldots O_k$, respectively. This may be represented by the formula:

$$\frac{\sum_{i=1}^{k} abs(C_i - O_i)}{\sum_{i=1}^{k} O_i} > p,$$

where N and p (p>0) are user-specified configuration values. At the end of each N-second period, the Router thread checks to see if the change of the histogram (the histogram which is locally monitored by the Router thread) is more than a user-specified percentage using the formula. If yes, the Router sends the new histogram in a Local Data Histogram Message (LDHM) to the WC. This actually means that: only when the change of local data skew is significant enough, the Router thread calls for a review on the current global DDM. It is to be noted that formula is just an example; the techniques herein may allow a customer to provide different formulas for different strategies.

On initialization, all Routers and the WC assume that there is no skewness among any of stocks. This means that the histogram in the Router thread at each AMP is initialized to be a uniform distribution. The WC also keeps a list of local histograms (one histogram for each AMP) and initializes all of them to a uniform distribution. Thus, the first DDM that the WC generates may simply be a hash-based plan like the one used in FIG. 2 because the FIG. 2 approach assumes no skewness. But as time progresses, if any Router thread at an AMP detects its local stream data is not uniformly distributed among stocks, the condition represented by the above-mentioned formula is satisfied at that AMP. In such a case, the Router thread sends its local histogram in a Local Data Histogram Message (LDHM) to the WC. Once receiving this message, the WC considers it as a call for current DDM review. The WC then merges the latest local histograms it keeps for all the AMPs to figure out a global histogram. Then the above-mentioned formula is used to check to see if the change of the global histogram is significant or not (based on a threshold difference value or deviation). If the deviation is not significant enough, the WC will ignore it. But if the deviation is significant enough (based on the threshold different value or deviation), the WC starts the computation of a new DDM.

The computation of a new DDM is performed by the WC thread in the Parser Engine. In an embodiment, the computation of a new DDM is modeled/represented as a dynamic optimization problem and that uses an efficient greedy algorithm to find a sub-optimal solution. For example, suppose that there are K stocks and M AMPs involved. An optimal assignment plan is found to assign K stocks into M groups so that the sum of the counters of all stocks in each group can be as close to each other as possible. In an embodiment, this is a (Non-deterministic Polynomial time) NP-hard problem, such that a greedy algorithm is preferred to find a sub-optimal solution. The algorithm proceeds as follows:

Sort all the K stocks on their counters in the global histogram in a descending order: $S_1(C_1), S_2(C_2) \ldots S_k(C_k)$, where $S_1$'s counter $C_1$ is the greatest and $S_k$'s counter $C_k$ is the least.

Initialize M groups $g_1, g_2, \ldots g_M$ with $g_1(set_1=\phi, w_1=0)$, $g_2(set_2=\phi, w_2=0), \ldots, g_M(set_M=\phi, w_M=0)$, where $set_i$ is the set of all stocks that have been assigned to group $g_i$, and the weight $w_i$ is the sum of the counters of all the stocks of that group.

Insert the M groups into a min-max heap binary tree using the weight as the key. Then, the item at the root node of the min-max heap binary tree at any time is always the group with the minimal weight at that time. This group is referred to as the current min-group.

Start to assign each stock to a selected group, one by one starting at the beginning of the sorted stock list, which is always the greatest one that has not been assigned. Each time, the current min-group is taken off of the min-max heap binary tree; assign the first stock in the sorted stock list to the current min-group's set and also update the current min-group's weight by adding it with the stock's counter. Next, insert the current min-group back to the min-max heap binary tree. This processing is repeated until all stocks have been assigned.

The sorting of stocks is achieved in time O(K×log K). The min-max heaps can be built in time O(M) and each insertion or deletion from the min-max heap is O(log M) time. So, the total computation complexity the algorithm is O(K×log K+K×log M+M). This is efficient enough to provide a nearly real-time computation considering k might be hundreds and M might be from tens or hundreds.

Finally, the WC broadcasts the new global DDM to the Routers on every AMP in a Global Data Distribution Map Message (GDDMM). Then, the Routers start to use the new DDM to distribute rows for the next round of aggregation. In an embodiment, the switch between using an old DDM and a new DDM on all Routers can be treated as a two-phase procedure. In the first phase, the WC broadcasts the new DDM to all Routers and collects the acknowledgement responses from all Routers (assume that WC knows how many Routers are running). Until then, the Routers are still using whatever old DDM they have to distribute the data. Then, in the second phase, the WC knows that the Routers have the new DDM, thus the WC broadcasts a Start New Map (SNM) to all the Routers; and then, the Routers start sending data using the new DDM. There may be a tiny timing window in which a Router has started to use the new DDM but another Router is still using an old DDM. This might cause two problems: 1) an Aggregator might receive multiple extra messages that it believes should go to another AMP in the new DDM (so such an Aggregator gets more work than it should have—but this situation is expected to be corrected quickly because the SNM goes through high-speed PDE (Parallel Database Extensions) messaging subsystem and the message channels used between Routers and the WC are dedicated for only this purpose) and 2) one stock might be calculated on two Aggregators (thus, the resultant stream may include two aggregated results for the same stock at the same minute). For the second problem, if the aggregated resultant rows include a monotonic increasing version number, then the downstream analytic nodes can choose to ignore the older version resultant rows in the resultant stream whenever they see two versions of aggregated results for the same stock and for the same minute (time period). So, the WC can give each DDM a version number and this version number can be embedded in the stream data when it is sent out by a Router. It is to be noted that different strategies and techniques can be used to address the two problems that may occur.

Returning to the stock example, the techniques described with the FIG. 3 provide superior processing throughput from that which is available in the industry. For example, instead of treating the 12 stocks equally and dividing them into 4 groups with each group including 3 stocks, an optimal distribution processing assignment is made where the most popular stocks GOOG, FB (FACEBOOK™ stock symbol), and AAPL (APPLE® stock symbol) for their own independent group, and each of the other 9 less popular smaller companies' stocks are in one single group together. When the four groups are mapped to four AMPs, each AMP may have a more balanced workload. In addition, if the market is waiting for some news for any popular stocks (such as: GOOG, FB and/or AAPL) or a significant news about a small company is released (such as an Initial Public Offering IPO for that small company), then such news may cause the trading activity of a stock to dramatically change in an opposite direction or in a more extreme trend (upward or downward) from what had been occurring for that stock, then with the approaches presented herein workload processing is automatically and dynamically re-balanced on the fly in real time as soon as the change or extreme trend begins to occur.

It is noted that the Router thread can be used to efficiently and dynamically distribute stream data with any intermediate real time data feed processing system and not just the Aggregator node as discussed with the FIG. 3 example scenario. Other stream analytic processing nodes like Join operators, reformatting operators, converting operators, content enhancement operators, and others can benefit from the distribution mechanisms provided by the teachings of the FIG. 3 as well.

These and other embodiments are now discussed with reference to the FIGS. 4-6.

Figure 4:
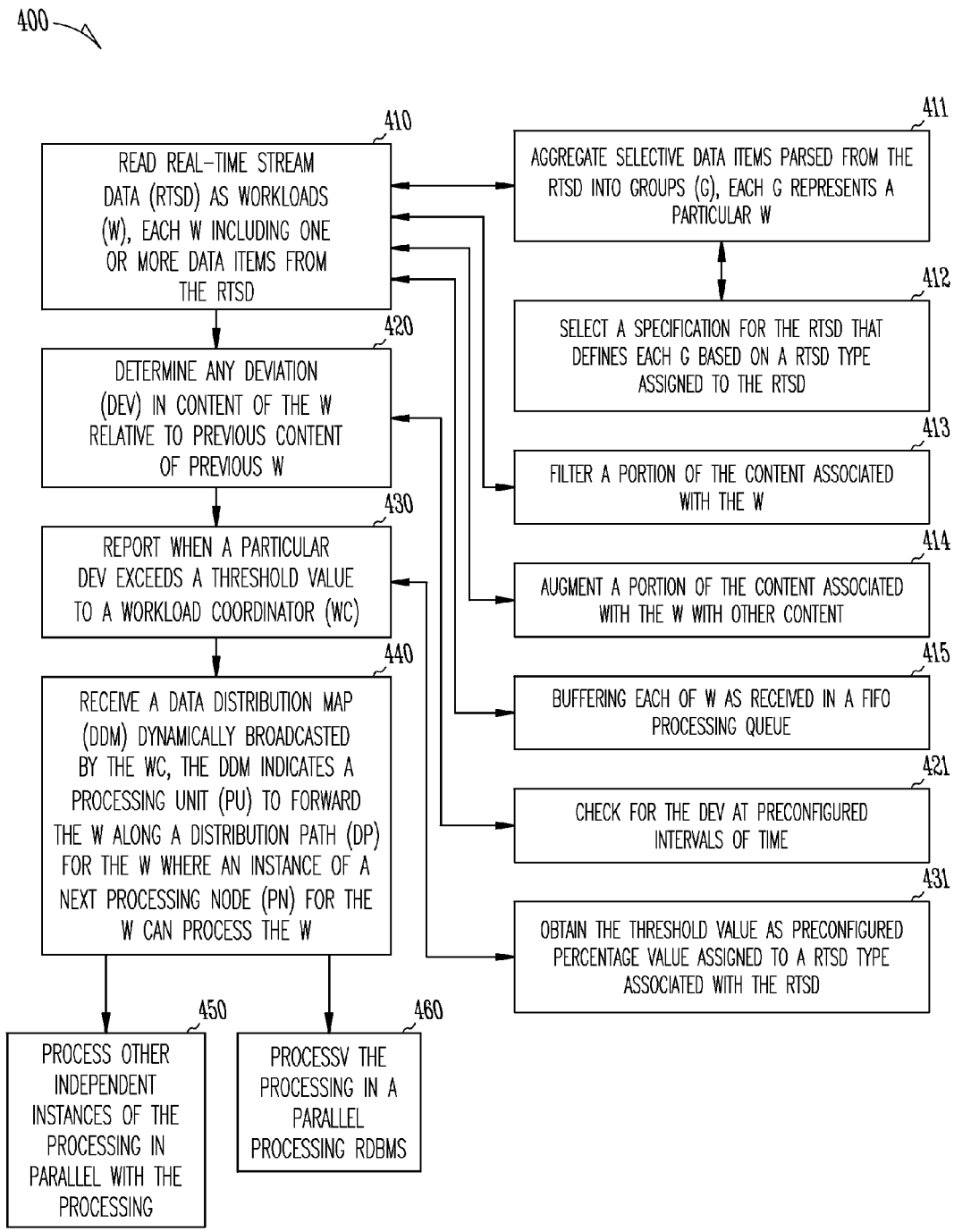
FIG. 4 is a diagram of a method for dynamic workload balancing using real-time stream data analytics, according to an example embodiment.

FIG. 4 is a diagram of a method 400 for dynamic workload balancing using real-time stream data analytics, according to an example embodiment. The method 400 (hereinafter "router thread") is implemented as executable instructions that are programmed and reside within memory and/or non-transitory computer-readable storage media for execution on processing nodes (processors) of a network; the network wired, wireless, and/or a combination of wired and wireless.

In an embodiment, the router thread executes on one or more processors of a RDBMS.

In an embodiment, the router thread implements, inter alia, the techniques discussed above with reference to the FIG. 3.

In an embodiment, the router thread is the Router discussed above with reference to the FIG. 3.

At 410, the router thread reads real-time stream data as workloads. Each workload includes one or more data items from the real-time stream data. In an embodiment, each workload comprises a record of data in a RDBMS. The real-time stream data can be associated with a variety of data sources and information topics. The real-time stream data is streamed or acquired over a network from a variety of data sources.

According to an embodiment, at 411, the router thread aggregates selective data items parsed from the real-time stream data into groups. Each group represents a particular workload.

In an embodiment of 411 and at 412, the router thread selects a specification for the real-time stream data that defines each group and how to parse each group from the real-time stream data based on a real-time stream data type assigned to the incoming real-time stream data.

In an embodiment, at 413, the router thread filters a portion of the content associated with the workload. This can be defined by processing rules or a specification associated with the real-time stream data as well.

In an embodiment, at 414, the router thread augments a portion of the content associated with the workload with other content. That is, the workload content is enhanced with new content. The augment content may be: computed from the original content of the workload content, obtained and, perhaps summarized, from previous content for previous workloads, acquired from portions of other real-time stream data previously processed, and the like.

It is noted that the processing of 411 and 413-414 is not have to be mutually exclusive such that the router thread can perform 411 and 413-414, combinations of 411 and 413-414, or, in some instances just one of 411, 413, or 414.

In an embodiment, at 415, the router thread buffers each workload as received in a FIFO processing queue. This was discussed above with reference to the FIG. 3.

At 420, the router thread determines any deviation in content of the workload relative to previous content of previously processed workloads. One mechanism for determining a deviation was the histogram and counter approach discussed above with reference to the FIG. 3. Others may be used as well where the deviation is relevant to real-time analytics captured and monitored by the router thread.

According to an embodiment, at 421, the router thread checks for the deviation at preconfigured time intervals.

At 430, the router thread reports when a particular deviation exceeds a threshold value. The particular deviation reported to a workload coordinator, such as the workload coordinator discussed above with respect to the FIG. 3 and the workload coordinator discussed below with respect to the discussion of the FIG. 5.

In an embodiment, at 431, the router thread obtains the threshold value as preconfigured percentage value assigned to a real-time stream data type associated with the real-time stream data.

At 440, the router thread receives a data distribution map that is dynamically broadcasted by the workload coordinator. The data distribution map indicates a processing unit to forward the workload along a distribution path for the workload, where an instance of a next processing node for the workload can process the workload.

In an embodiment, the processing units are AMPs in a RDBMS as discussed above in the FIG. 3.

In an embodiment, a processing node is a node having an application or service that performs some data processing and perhaps, enhancement and/or customization, on the workload as it progress along the data delivery path.

In an embodiment, a single processing unit can have multiple instances of a same processing node.

In an embodiment, a single processing unit can have different types of processing nodes.

In an embodiment, a single processor of a multiprocessor architecture includes a single processing unit.

In an embodiment, a single processor of a multiprocessor architecture includes two or more processing units.

According to an embodiment, at 450, the router thread processes other independent instances of the router thread in parallel with the router thread. Thus, the router thread and its independent instances can simultaneously process in parallel within a multiprocessor architecture, such as was discussed above with reference to the FIGS. 2 and 3.

In an embodiment, at 460, and as was previously discussed, the router thread processes in a parallel processing RDBMS, such as the RDBMS discussed above with reference to the FIGS. 2 and 3.

Figure 5:
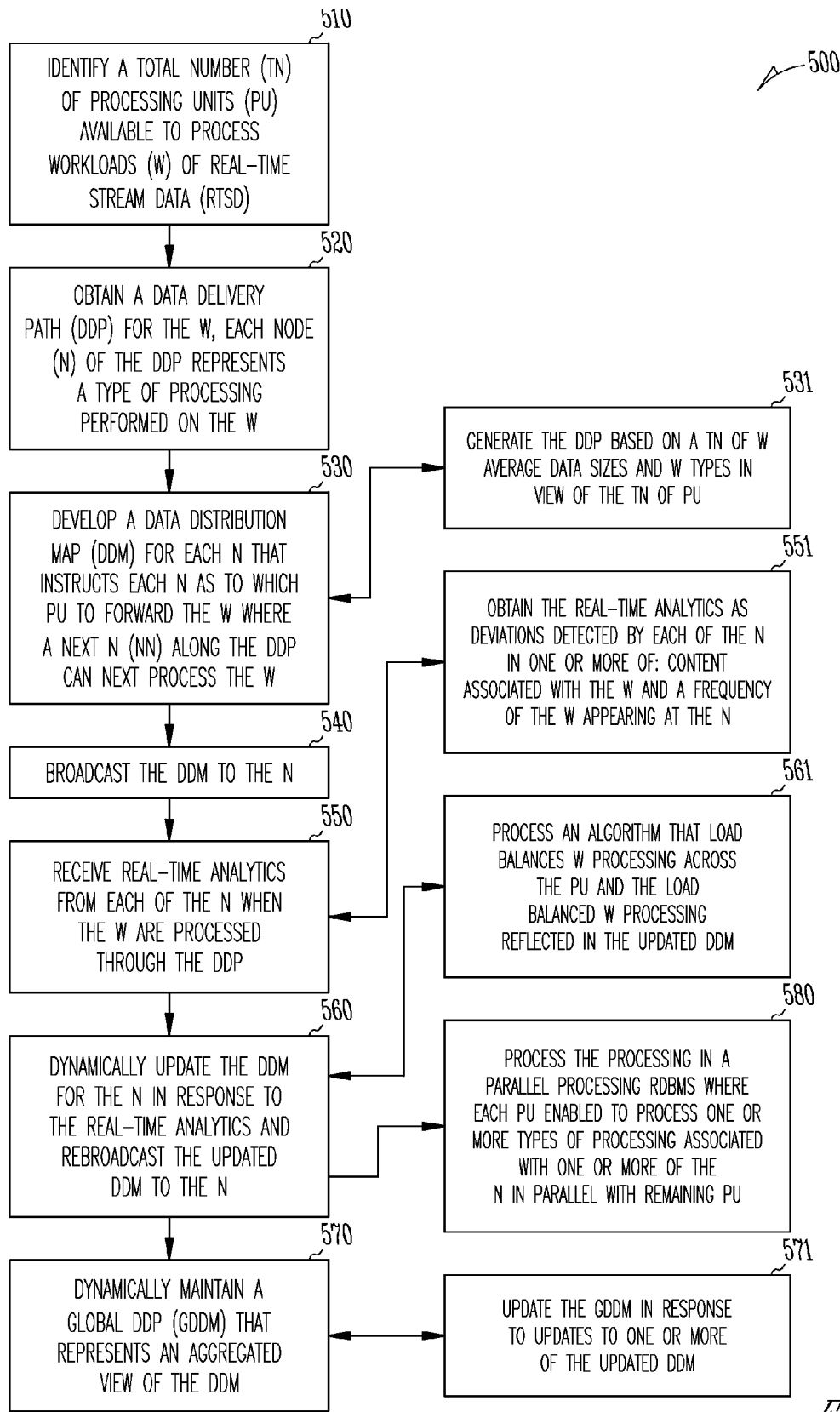
FIG. 5 is a diagram of another method for dynamic workload balancing using real-time stream data analytics, according to an example embodiment.

FIG. 5 is a diagram of another method 500 for dynamic workload balancing using real-time stream data analytics, according to an example embodiment. The method 200 (hereinafter "workload coordinator") is implemented as executable instructions within memory and/or non-transitory computer-readable storage media that execute on one or more processors, the processors specifically configured to execute the workload coordinator. The workload coordinator is also operational over a network; the network is wired, wireless, or a combination of wired and wireless.

In an embodiment, workload coordinator is the workload coordinator discussed above with reference to the FIG. 3.

The workload coordinator interacts with the router thread discussed above with reference to the FIG. 4 to perform dynamic workload balancing using real-time stream data analytics.

At 510, the workload coordinator identifies a total number of processing units available to process workloads parsed from real-time stream data. The processing units were discussed above with reference to the FIG. 3 as AMPS and discussed as embodiments of the FIG. 2.

At 520, the workload coordinator obtains a data delivery path for each workload. Each node of the data delivery path represents a type of processing (enhancement) performed on the workload as the workload traverses the data delivery path. The end of the data delivery path includes delivery to a consuming client application or client device as discussed above with reference to the FIG. 3.

At 530, the workload coordinator develops a data distribution map for each node that instructs each node as to which processing unit to forward the workload where a next processing node along the data distribution path can next perform its processing on the workload.

According to an embodiment, at 531, the workload coordinator generates the data distribution path based on a total number of workload average data sizes and workload types in view of the total number of available processing units.

At 540, the workload coordinator broadcasts the data distribution maps to the processing nodes. In an embodiment, the processing nodes each have an instance of the router thread discussed above with reference to the FIG. 4. In an embodiment, the data distribution maps are broadcasts as an aggregated map that each processing node knows how to obtain its specific data distribution map from.

At 550, the workload coordinator receives real-time analytics from each of the processing nodes when the workloads are processed through the data distribution path. In an embodiment, the real-time analytics are only sent from the processing nodes to the workload coordinator when the processing nodes detect a predefined deviation in the real-time analytics from previously captured analytics.

So, in an embodiment, at 551, the workload coordinator obtains the real-time analytics as deviations detected by each of the processing nodes where the deviations are relevant to one or more deviations in: content associated with the workloads and/or a frequency of the workloads appearing at the processing nodes.

At 560, the workload coordinator dynamically updates the data distribution map for the processing nodes in response to the real-time analytics and rebroadcasts the updated data distribution maps to the processing nodes for immediate deployment and usage when processing the workloads.

In an embodiment, at 561, the workload coordinator processes an algorithm, which load balances the workloads processing across the processing units. The load balanced workload processing is reflected in the updated data distribution map. One algorithm for performing the load balancing of the data distribution map was discussed above with reference to the FIG. 3.

According to an embodiment, at 570, the workload coordinator dynamically maintains a global data distribution map, which represents an aggregated view of all of the data distribution maps.

In an embodiment of 570 and at 571, the workload coordinator updates the global data distribution map in response to updates to one or more of the updated data distribution maps.

In an embodiment, at 580, the workload coordinator is processed in a parallel processing RDBMS architecture, where each processing unit is enabled to process one or more types of processing associated with one or more of the processing nodes in parallel with remaining ones of the processing units.

Figure 6:
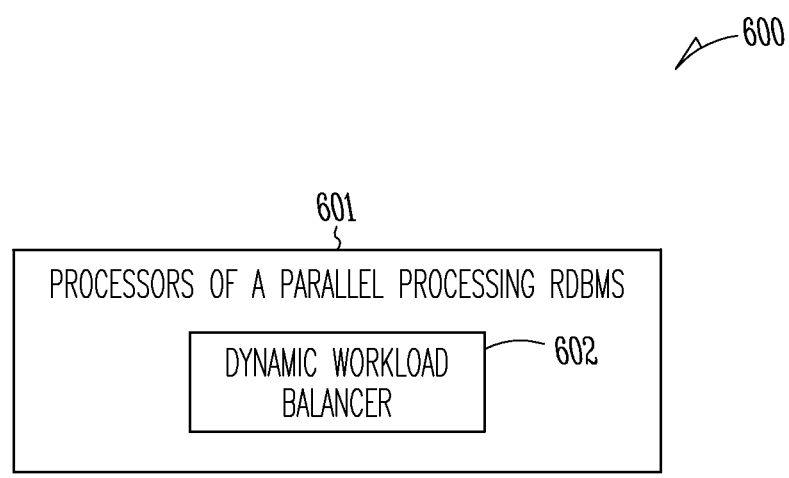
FIG. 6 is a diagram of a dynamic workload balancing data analytic system, according to an example embodiment.

FIG. 6 is a diagram of a dynamic workload balancing data analytic system 600, according to an example embodiment. Some components of the dynamic workload balancing data analytic system 600 are implemented as executable instructions that are programmed and reside within memory and/or non-transitory computer-readable storage medium that execute one or more processors of a network. The network is wired, wireless, or a combination of wired and wireless.

In an embodiment, dynamic workload balancing data analytic system 600 implements, inter alia, the techniques presented above with the FIG. 3.

In an embodiment, the dynamic workload balancing data analytic system 600 implements, inter alia, the techniques presented above with the method 400 of the FIG. 4.

In an embodiment, the dynamic workload balancing data analytic system 600 implements, inter alia, the techniques presented above with the method 500 of the FIG. 5.

In an embodiment, the dynamic workload balancing data analytic system 600 implements, inter alia, the techniques presented above with the methods 400 of the FIG. 4 and the methods 500 of the FIG. 5 and with respect to the techniques presented in the FIG. 3.

The dynamic workload balancing data analytic system 600 includes a plurality of processors 601 of a parallel processing architecture and a dynamic workload balancer 602.

In an embodiment, processors 601 are part of a parallel processing RDBMS.

The dynamic workload balancer 602 is adapted and configured to: execute on one or more of the processors 601, dynamically develops a global data distribution map that defines a next processing unit for a workload associated with real-time stream data processing along a distribution path of a network (the distribution path includes a plurality of processing nodes and each processing node representing a type of processing (enhancement) performed on the workload, dynamically update the global data distribution map in response to real-time deviations detected in real-time stream data analytics reported by the processing nodes while processing the workload, and dynamically broadcast the global data distribution map to router threads processing on each node along the distribution path to rebalance the real-time stream data in real time.

In an embodiment, the dynamic workload balancer 602 is the workload coordinator discussed with the FIG. 3.

In an embodiment, the dynamic workload balancer 602 is the workload coordinator discussed with the FIG. 5.

In an embodiment, each processing unit is processed on one or more of the processors 601.

In an embodiment of the latter embodiment, each processor 601 is configured to process a plurality of independent processing node instances and each processing node instance is processed on one or more of the processing units in parallel with remaining processing node instances appearing on other ones of the processors 601.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
   reading, by a processor, real-time stream data as workloads, each workload including one or more data items from the real-time stream data;
   determining, by the processor, any deviation in content of the workloads relative to previous content of previous workloads;
   reporting, by the processor, when a particular deviation exceeds a threshold value to a workload coordinator; and
   receiving, by the processor, a data distribution map dynamically broadcasted by the workload coordinator, the data distribution map indicates a processing unit to forward the workloads along a distribution path for the workloads where an instance of a next processing node for the workloads can process the workload.

2. The method of claim 1 further comprising, processing other independent instances of the method in parallel with the method on the other processing units.

3. The method of claim 1 further comprising, processing the method in a parallel processing Relational Database Management System (RDBMS).

4. The method of claim 1, wherein reading further includes aggregating selective data items parsed from the real-time stream data into groups, each group representing a particular one of the workloads.

5. The method of claim 2, wherein aggregating further includes selecting a specification for the real-time stream data that defines each of the groups based on a real-time stream data type assigned to the real-time stream data.

6. The method of claim 1, wherein reading further includes filtering a portion of the content associated with the workloads.

7. The method of claim 1, wherein reading further includes augmenting a portion of the content associated with the workload with other content.

8. The method of claim 1, wherein reading further includes buffering each of the workloads as received in a First-In First-Out (FIFO) processing queue.

9. The method of claim 1, wherein determining further includes checking for the deviation at preconfigured intervals of time.

10. The method of claim 1, wherein reporting further includes obtaining the threshold value as a predefined percentage value assigned to a real-time stream data type associated with the real-time stream data.

11. A method, comprising:
    identifying, by a processor, a total number of processing units available to process workloads of real-time stream data;
    obtaining, by the processor, a data delivery path for the workloads, each node of the data delivery path representing a type of processing performed on the workloads;
    developing, by the processor, a data distribution map for each node that instructs each node as to which processing unit to forward the workloads where a next node along the delivery path can next process the workloads;
    broadcasting, by the processor, the data distribution maps to the nodes;
    receiving, by the processor, real-time analytics from each of the nodes when the workloads are processed through the data delivery path; and
    dynamically updating, by the processor, the data distribution maps for the nodes in response to the real-time analytics and rebroadcasting the updated data distribution maps to the nodes.

12. The method of claim 11 further comprising, dynamically maintaining, by the processor, a global data distribution map that represents an aggregated view of the data distribution maps.

13. The method of claim 12, wherein dynamically maintaining further includes updating the global data distribution map in response to updates to one or more of the updated data distribution maps.

14. The method of claim 11 further comprising, processing the method in a parallel processing Relational Database Management System (RDBMS), wherein each processing unit enabled to process one or more types of processing associated with one or more the nodes in parallel with remaining processing units.

15. The method of claim 11, wherein developing further includes generating the data distribution maps based on a total number of workload average data sizes and workload types in view of the total number of processing units.

16. The method of claim 11, wherein receiving further includes obtaining the real-time analytics as deviations detected by each of the nodes in one or more of: content associated with the workloads and a frequency of the workloads appearing at the nodes.

17. The method of claim 11, wherein dynamically updating further includes processing an algorithm that load balances workload processing across the processing units and the load balanced workload processing reflected in the updated data distribution maps.

18. A system, comprising:
    processors arranged in a parallel processing Relational Database Management System (RDBMS); and
    a dynamic workload balancer configured to: i) execute on one or more of the processors, ii) dynamically develops a global data distribution map that defines a next processing unit for a workload associated with real-time stream data processing along a distribution path of a network, wherein the distribution path includes a plurality of processing nodes and each node representing a type of processing performed on the workload iii) dynamically updates the global data distribution map in response to real-time deviations detected in real-time stream data analytics reported by the processing nodes while processing the workload, and iv) dynamically broadcasts the global data distribution map to router threads processing on each node along the distribution path to rebalance the real-time stream data processing in real time.

19. The system of claim 18, wherein each processing unit is processed on one or more of the processors.

20. The method of claim 19, each processor is configured to process a plurality of independent processing node instances and each processing node instance is processed on one or more of the processing units in parallel with remaining processing node instances appearing on other ones of the processors.

* * * * *